Patented Nov. 28, 1939

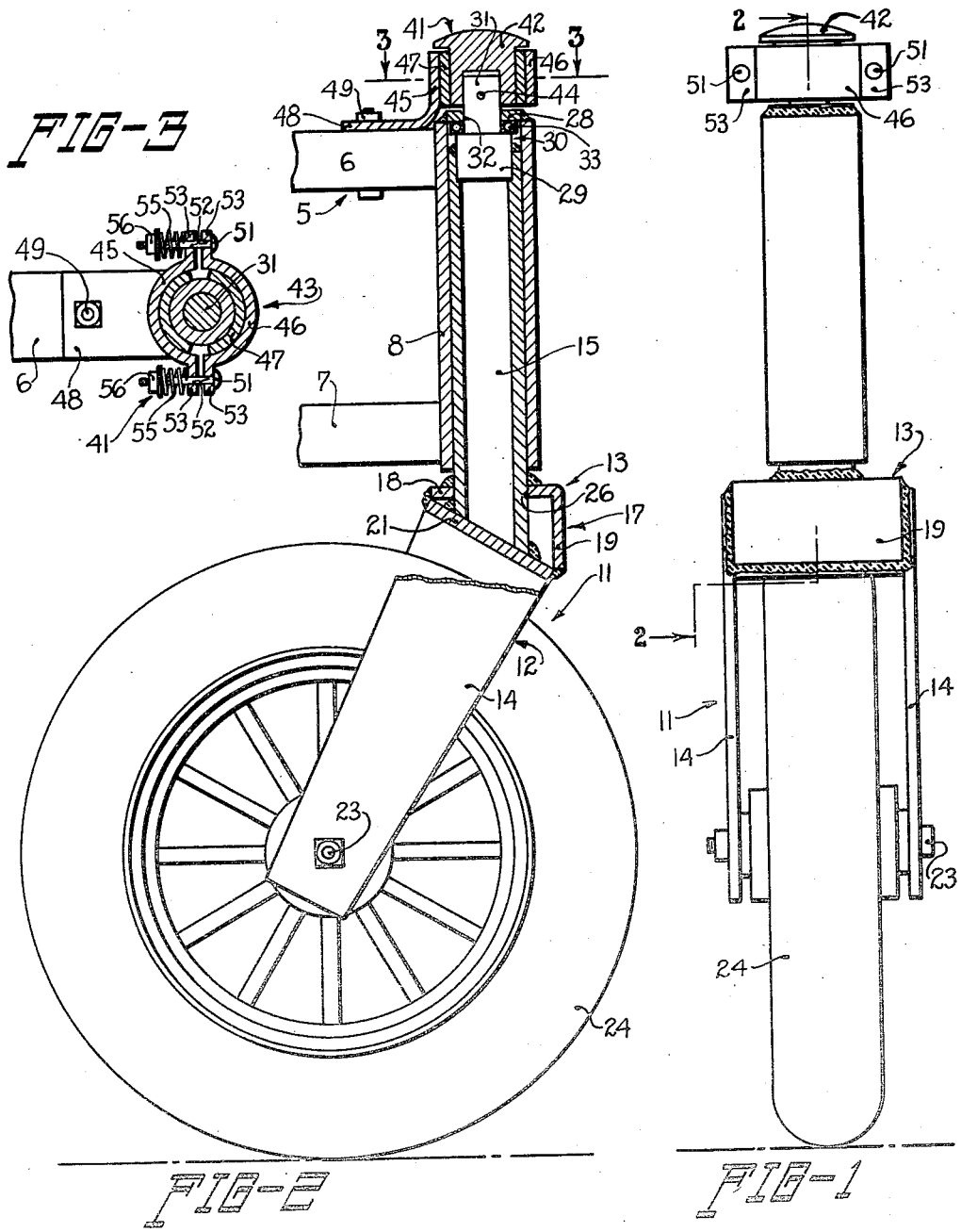

2,181,722

UNITED STATES PATENT OFFICE 2,181,722

CASTER WHEEL

Russell A. Butter, Orion, and Leonard B. Neighbour, Moline, Ill., assignors to Deere & Company, Moline, Ill., a corporation of Illinois Application May 29, 1937, Serial No. 145,488

4 Claims. (Cl. 16—31)

Our invention relates to caster wheels of the class generally used to support vehicles such as wagons, manure spreaders, etc., and is concerned particularly with improvements in the type of caster wheel structure which is provided for supporting the front end of the manure spreader shown and described in the Swanson et al. Patents No. 1,945,125 which issued under date of January 30, 1934, and No. 1,963,478 which issued June 19, 1934.

The principal object of the present invention is to provide an improved caster wheel that is light in weight, strong and durable in construction, and economical to manufacture. In the accomplishment of this object, we have devised a caster fork comprising a welded assembly of wrought metal parts. In order to provide ample strength in the parts which are subjected to the greatest stresses and in which failures due to overload and to fatigue occur most frequently, the central tie portion of the fork is of tubular construction, thus providing for maximum strength with minimum weight.

A further object relates to the provision of means for retarding the castering action of the fork to prevent wobbling or "shimmying" of the caster wheel during operation. It has been found that a caster wheel not only "shimmies" when operated at high speed, but tends to spin around whenever the wheel bounces on uneven ground, and the subsequent shock, due to the wheel engaging the ground when it is out of its normal plane, is not only disagreeable but unsafe.

Further objects and advantages of the invention will be apparent to those skilled in the art to which this device pertains after a consideration of the following detailed description, taken in conjunction with the accompanying drawing illustrating the preferred construction, wherein;

Figure 1 is a front elevational view of our improved caster wheel;

Figure 2 is a sectional side elevational view taken substantially on the plane of line 2—2 of Figure 1; and Figure 3 is a detail sectional view taken on the plane of line 3—3 of Figure 2.

In the drawing, reference numeral 5 indicates the fragmentary front portion of a vehicle frame having upper and lower bars 6 and 7, respectively, which are welded or otherwise secured at their front ends to a vertically disposed cylindrical sleeve 8.

The caster wheel structure, referred to in its entirety by numeral 11, comprises a fork 12 of fabricated construction, having a central tie portion 13, depending side plates or legs 14 and a vertical stem 15. The central tie portion 13 is of tubular construction triangular in cross section and comprises an angle iron member 17 arranged with the top side 18 disposed in a horizontal plane and the opposite or front side 19 in a vertical plane. A plate member 21 extends diagonally between the outer edges of the sides 18 and 19 and is welded or otherwise secured thereto and constitutes the lower side of the tie portion 13. The depending side plates 14 extend diagonally downwardly and rearwardly from the tie portion 13 and are secured at their upper ends, preferably by welding, over the open ends of the tie portion 13. The side plates 14 are arranged in parallel relation and are provided adjacent their lower ends with aligned apertures adapted to receive a horizontal bolt or wheel spindle 23. A wheel 24, in the present instance of the pneumatic tired type, is journaled on the spindle 23 between the side plates 14.

An aperture 26 is provided in the top side 18 of the tie portion 13 and is adapted to receive the lower end of the tubular cylindrical vertical stem 15. The lower end of the stem 15 is beveled at an angle corresponding to the angle of the diagonal plate member 21 to permit it to rest on the member 21. The stem 15 is secured, by welding, to the plate member 21 and to the top side 18 of the tie portion 13. The stem 15 extends upwardly beyond the central tie portion 13 and is journaled in the vertical sleeve 8, the upper end thereof terminating just below the upper end of the sleeve 8. The upper end of the sleeve 8 is enclosed by a circular plate 28 which may either be welded thereto or formed thereon as desired. The enlarged end 29 of a spindle 30 is projected into the upper end of the stem 15 and is welded or otherwise secured therein. The spindle 30 is provided with a reduced portion 31 which extends outwardly through an aperture 32 in the plate 28. An anti-friction thrust bearing 33 is provided around the reduced portion 31, and engages the enlarged end 29 of the spindle 30 and the plate 28 to provide free movement of the stem 15 in the sleeve 8.

It is desirable, under certain conditions, as explained above, to retard the turning movement of the caster wheel to restrain it from swinging out of its normal operating plane. To facilitate this, a brake device 41 is provided. The brake device 41 comprises a cap or drum 42 and a brake band 43. The drum 42 is secured on the projecting end 31 of the spindle 30 by a pin 44 which extends through aligned holes provided for this purpose in these members. The brake band 43 is of the two-piece type comprising a stationary member 45 and a movable member 46. The members 45 and 46 are semi-circular in form, the stationary member engaging the rear surface of the drum 42 and the movable member engaging the front surface of drum 42. The members 45 and 46 are each provided with a section of brake lining 47 which is riveted on the inner surface of the member. The stationary member 45 is provided with a bracket 48 which is bolted to the upper frame bar 6 by a bolt 49. The movable member 46 is attached to the stationary member 45 by means of bolts 51 which extend through aligned holes 52 provided in outwardly extending ears 53 formed on the ends of the members 45 and 46. Springs 55 are provided on the bolts 51 between the nuts 56 of the bolts 51 and the adjacent ears 53 to permit the member 46 to yield relative to the member 45.

Under ordinary conditions when the vehicle is to be driven at a relatively slow speed, the brake band is released by loosening the nuts 56 of the bolts 51. When it is desired to drive the vehicle at a high speed, as for instance when transporting it over an improved highway, the nuts 56 may be tightened to retard the turning movement of the caster wheel to eliminate wobbling or "shimmying" of the wheel. In the present structure any degree of pressure desired may be applied to the drum 42 even to the extent of locking the wheel against any turning movement.

From the foregoing description it will be understood that we have devised a novel and improved type of caster wheel and one which is strong and durable in construction and economical to manufacture. A caster wheel yoke of the type described, wherein the central tie portion is formed of a box like or tubular member, provides a stronger structure than similar devices of much greater weight which have previously been constructed. Therefore, the present structure has been found to have a particular advantage over the conventional yoke wherein the tie portion is formed of solid metal.

While we prefer to embody our invention as specifically illustrated and described herein, it is to be understood that it is not limited to such specific construction, except in so far as claims may be directed thereto, as it will be apparent that various changes and modifications of such structure may be made without departing from the invention pointed out in the generic claims.

What we claim is:

1. A caster wheel fork comprising a triangular tubular central tie portion including an angle member and a plate member, said angle member being positioned with one side disposed in a horizontal plane and the opposite side disposed in a vertical plane, said plate member extending diagonally between outer edges of said angle member and secured thereto, said horizontal side having an aperture, a vertical stem extending through said aperture and resting on said plate member and secured to said horizontal side and said plate member, and an elongated plate at each side of said tie portion and secured to the ends of said angle member and said plate member and extending downwardly therefrom.

2. A caster wheel fork comprising a triangular tubular central tie portion including an angle member and a plate member extending diagonally between the edges of said angle member and secured thereto, there being an aperture provided in one of said members, a stem extending through said aperture and attached to the member opposite thereto, and an elongated plate at each side of said tie portion and secured to the ends of said angle member and said plate member and extending downwardly therefrom.

3. A wheel fork comprising a plurality of structural metal sections rigidly fixed together to form a transversely disposed, open ended, tubular tie member, and a pair of side plates rigidly secured over opposite ends, respectively, of said tie member and extending downwardly to provide wheel supports.

4. A wheel fork comprising an angle member, a plate member extending diagonally between the edges of said angle member and secured thereto to form a transversely disposed, open ended, tubular tie member of triangular cross section, and a pair of side plates rigidly secured over opposite ends, respectively, of said tie member and extending downwardly to provide wheel supports.

RUSSELL A. BUTTER.
LEONARD B. NEIGHBOUR.